US011330579B2

(12) United States Patent
Guo et al.

(10) Patent No.: US 11,330,579 B2
(45) Date of Patent: May 10, 2022

(54) METHOD AND APPARATUS FOR UPLINK CARRIER INDICATION

(71) Applicant: Huawei Technologies Co., Ltd., Shenzhen (CN)

(72) Inventors: Zhiheng Guo, Beijing (CN); Xinqian Xie, Beijing (CN); Zukang Shen, Beijing (CN); Yi Long, Beijing (CN); Yang Zhao, Shanghai (CN); Lei Wan, Beijing (CN); David Jean-Marie Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 16/862,296

(22) Filed: Apr. 29, 2020

(65) Prior Publication Data
US 2020/0260424 A1 Aug. 13, 2020

Related U.S. Application Data

(63) Continuation of application No. PCT/CN2018/113823, filed on Nov. 2, 2018.

(30) Foreign Application Priority Data

Nov. 2, 2017 (CN) .......................... 201711066692.X

(51) Int. Cl.
*H04W 72/04* (2009.01)
*H04L 1/00* (2006.01)
*H04L 5/00* (2006.01)

(52) U.S. Cl.
CPC ......... *H04W 72/042* (2013.01); *H04L 1/0038* (2013.01); *H04L 5/001* (2013.01);
(Continued)

(58) Field of Classification Search
CPC ............ H04W 72/042; H04W 72/0453; H04L 1/0038; H04L 5/001; H04L 5/0042; H04L 5/0094
See application file for complete search history.

(56) References Cited

U.S. PATENT DOCUMENTS

| 11,039,423 B2 | 6/2021 | Song et al. |
| 2011/0064042 A1* | 3/2011 | Kim ..................... H04L 5/0094 370/329 |

(Continued)

FOREIGN PATENT DOCUMENTS

| CN | 101998509 A | 3/2011 |
| CN | 101998584 A | 3/2011 |

(Continued)

OTHER PUBLICATIONS

Huawei et al, "Remaining issues on NR CA and DC including SRS switching", 3GPP TSG RAN WGI Meeting #91, R1-1719383, Nov. 27-Dec. 1, 2017, 20 pages, Reno, USA.

(Continued)

*Primary Examiner* — Jael M Ulysse
(74) *Attorney, Agent, or Firm* — Slater Matsil, LLP

(57) ABSTRACT

A communication method and an apparatus are provided. The method includes: receiving, by a terminal device, downlink control information (DCI) from a network device on a first downlink carrier; and determining a first uplink carrier or a second uplink carrier based on the DCI, where the DCI indicates an uplink carrier to be used by the terminal device to send an uplink signal to the network device is the first uplink carrier or the second uplink carrier; the DCI for indicating the first uplink carrier and the DCI for indicating the second uplink carrier having equal bit quantity; and the first downlink carrier, the first uplink carrier, and the second uplink carrier belong to a same cell.

29 Claims, 6 Drawing Sheets

(52) U.S. Cl.
CPC .......... *H04L 5/0042* (2013.01); *H04L 5/0094* (2013.01); *H04W 72/044* (2013.01)

(56) References Cited

U.S. PATENT DOCUMENTS

| | | | |
|---|---|---|---|
| 2011/0105165 A1* | 5/2011 | Sagfors | H04W 72/04 455/507 |
| 2011/0134774 A1* | 6/2011 | Pelletier | H04L 5/001 370/252 |
| 2011/0267978 A1* | 11/2011 | Etemad | H04L 47/283 370/254 |
| 2011/0310818 A1* | 12/2011 | Lin | H04L 5/0048 370/329 |
| 2012/0069795 A1* | 3/2012 | Chung | H04L 5/0007 370/315 |
| 2012/0236812 A1* | 9/2012 | Chen | H04W 72/042 370/329 |
| 2012/0243516 A1* | 9/2012 | Ishii | H04L 5/0053 370/336 |
| 2012/0257552 A1* | 10/2012 | Chen | H04L 5/001 370/280 |
| 2012/0257554 A1* | 10/2012 | Kim | H04L 1/1887 370/280 |
| 2012/0314667 A1 | 12/2012 | Taoka et al. | |
| 2013/0010619 A1* | 1/2013 | Fong | H04W 72/0453 370/252 |
| 2013/0083741 A1* | 4/2013 | Larsson | H04W 52/48 370/329 |
| 2013/0114461 A1* | 5/2013 | Seo | H04L 1/0026 370/252 |
| 2013/0121299 A1* | 5/2013 | Kim | H04L 5/001 370/329 |
| 2013/0176952 A1* | 7/2013 | Shin | H04W 72/042 370/329 |
| 2014/0086184 A1* | 3/2014 | Guan | H04L 5/001 370/329 |
| 2014/0105151 A1 | 4/2014 | Hong | |
| 2014/0204854 A1* | 7/2014 | Freda | H04W 72/042 370/329 |
| 2014/0369242 A1* | 12/2014 | Ng | H04L 5/001 370/280 |
| 2015/0085797 A1* | 3/2015 | Ji | H04J 13/10 370/329 |
| 2015/0110029 A1* | 4/2015 | Hwang | H04L 1/0031 370/329 |
| 2015/0117336 A1 | 4/2015 | Huss et al. | |
| 2015/0245347 A1* | 8/2015 | Yi | H04L 5/001 370/280 |
| 2015/0319777 A1* | 11/2015 | Seo | H04W 76/19 370/330 |
| 2016/0143035 A1* | 5/2016 | Xue | H04W 72/042 370/329 |
| 2016/0242153 A1* | 8/2016 | Chen | H04L 5/1476 |
| 2017/0034808 A1* | 2/2017 | Ouchi | H04W 52/226 |
| 2017/0302419 A1* | 10/2017 | Liu | H04L 5/0082 |
| 2017/0359808 A1* | 12/2017 | Dinan | H04W 72/1289 |
| 2018/0007731 A1* | 1/2018 | Park | H04W 76/15 |
| 2019/0082451 A1* | 3/2019 | Yun | H04L 5/001 |
| 2020/0084682 A1* | 3/2020 | Wang | H04W 28/18 |

FOREIGN PATENT DOCUMENTS

| | | |
|---|---|---|
| CN | 102215586 A | 10/2011 |
| CN | 102594537 A | 7/2012 |
| CN | 104871448 A | 8/2015 |
| CN | 104904155 A | 9/2015 |
| CN | 105763307 A | 7/2016 |
| CN | 106454694 A | 2/2017 |
| EP | 2938013 A1 | 10/2015 |
| JP | 2021501530 A | 1/2021 |
| KR | 101646920 B1 | 8/2016 |
| WO | 2016165123 A1 | 10/2016 |
| WO | 2017045180 A1 | 3/2017 |
| WO | 2017076475 A1 | 5/2017 |
| WO | 2019088676 A1 | 5/2019 |

OTHER PUBLICATIONS

Huawei et al, "Correction to multi-carrier NPRACH IE name in PDCCH order DCI format N1", 3GPP TSG-RAN WG1 Meeting #90bis, R1-1716988, Oct. 9-13, 2017, 2 pages, Prague, Czech Republic.

3rd Generation Partnership Project; Technical Specification Group Radio Access Network; NR;User Equipment (UE) radio transmission and reception; Part 1: Range 1 Standalone (Release 15), 3GPP TS 38.101-1 V0.0.1 (Aug. 2017), 11 pages.

3rd Generation Partnership Project; Technical Specification Group Radio Access Network; NR; Multiplexing and channel coding(Release 15), 3GPP TS 38.212 V1.0.0 (Sep. 2017), 28 pages.

3rd Generation Partnership Project;Technical Specification Group Radio Access Network; NR; Radio Resource Control (RRC); Protocol specification (Release 15), 3GPP TS 38.331 V0.1.0 (Oct. 2017), 42 pages.

Vivo, "Remaining details for bandwidth part operation", 3GPP TSG RAN WG1 Meeting 90bis, R1-1717504, Oct. 9-13, 2017, 4 pages, Prague, CZ.

NTT Docomo, Inc.,"Views on other aspect on carrier aggregation", 3GPP TSG RAN WG1 Meeting 90bis, R1-1718224, Prague, CZ, Oct. 9-13, 2017, total 3 pages.

Huawei et al., "Other issues on NR CA and DC including SRS switching and SUL", 3GPP TSG RAN WG1 Meeting #90bis, R1-1717080, Prague, Czech Republic, Oct. 9-13, 2017, total 9 pages.

Nokia et al., "On DCI formats, DCI content and the configurability of DCI fields in NR", 3GPP TSG RAN WG1 NR#90bis, R1-1718604, Prague, CZ, Oct. 9-13, 2017, total 4 pages.

Catt, "Discussion on NR DCI formats", 3GPP TSG RAN WG1 Meeting 90bis, R1-1717825, Prague, CZ, Oct. 9-13, 2017, total 5 pages.

Huawei, "Offline discussion report for SUL remaining issues", 3GPP TSG-RAN WG2 Meeting #100, R2-1714173, Reno, USA, Nov. 27-Dec. 1, 2017, total 5 pages.

* cited by examiner

METHOD AND APPARATUS FOR UPLINK CARRIER INDICATION

CROSS-REFERENCE TO RELATED APPLICATIONS

This application is a continuation of International Application No. PCT/CN2018/113823, filed on Nov. 2, 2018, which claims priority to Chinese Patent Application No. 201711066692.X, filed on Nov. 2, 2017. The disclosures of the aforementioned applications are hereby incorporated by reference in their entireties.

TECHNICAL FIELD

The present invention relates to the field of communications technologies, and in particular, to a communication method and an apparatus.

BACKGROUND

In a wireless communications system, a type of communication may vary with types of a sending node and a receiving node. Generally, downlink communication means that a network device sends information to a terminal device, and uplink communication means that a terminal device sends information to a network device. In a long term evolution (LTE)/long term evolution advanced (LTE-A) communications system, a duplex mode may be mainly classified into a frequency division duplex (FDD) mode and a time division duplex (TDD) mode.

For a wireless communications system operating in the TDD mode, a downlink carrier and an uplink carrier are carriers with a same carrier frequency. An uplink-downlink decoupling technology may be applied to a new radio (NR) technology of a fifth-generation (5th generation, 5G) mobile communications system. To be specific, in addition to using a TDD carrier to perform uplink communication and downlink communication, an additional uplink carrier may also be used to perform uplink communication, and the additional uplink carrier is usually referred to as a supplementary uplink (SUL) carrier, in other words, a terminal device in the NR may have two uplink carriers at the same time for uplink communication.

In the prior art, a network device sends downlink control information (DCI) to a terminal device on some predetermined downlink resources. Correspondingly, the terminal device detects and obtains the DCI on these downlink resources through blind detection, in other words, the terminal device attempts to detect the DCI on a plurality of possible control resources that carry the DCI. However, a specific technical solution to a case in which the terminal device can be scheduled to send PUSCHs on two or more uplink carriers still needs to be further explored and researched.

SUMMARY

This application provides a communication method and an apparatus, so as to improve efficiency of blind detection for DCI by a terminal device that can be scheduled on two or more uplink carriers.

According to a first aspect, this application provides a communication method, including: receiving, by a terminal device, downlink control information DCI from a network device on a first downlink carrier, where the DCI indicates an uplink carrier to be used by the terminal device to send an uplink signal to the network device is a first uplink carrier or a second uplink carrier; and a first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device; and determining, by the terminal device, the first uplink carrier or the second uplink carrier based on the DCI.

Therefore, because the first bit quantity is equal to the second bit quantity, the terminal device may perform blind detection for the DCI in search space based on the first bit quantity (or the second bit quantity), in other words, only needs to perform blind detection in the search space based on one bit quantity of the DCI, so as to improve efficiency of blind detection for the DCI by the terminal device, and effectively avoid a problem that the terminal device possibly needs to perform blind detection for the DCI based on a plurality of different bit quantities of the DCI in the prior art.

In a possible design, the DCI includes a first indicator field, and the first indicator field indicates the first uplink carrier or the second uplink carrier.

In a possible design, the determining, by the terminal device, the first uplink carrier or the second uplink carrier based on the DCI includes: receiving, by the terminal device, a first message from the network device, where the first message indicates that the DCI includes a first indicator field, and the first indicator field indicates the first uplink carrier or the second uplink carrier; and determining, by the terminal device, the first uplink carrier or the second uplink carrier based on the first indicator field.

In a possible design, the first uplink carrier includes at least one uplink bandwidth part BWP, and the second uplink carrier includes at least one uplink BWP; and the first indicator field indicates an uplink BWP on the first uplink carrier or an uplink BWP on the second uplink carrier.

In a possible design, there are at least two serving cells for the terminal device, and the first uplink carrier and the second uplink carrier belong to one of the at least two serving cells; and the uplink carrier indicated by the first indicator field is in the first serving cell.

In a possible design, there are at least two serving cells for the terminal device, the first uplink carrier and the second uplink carrier belong to one of the at least two serving cells, and the DCI further includes a third indicator field; the third indicator field indicates a first serving cell in the at least two serving cells; and the uplink carrier indicated by the first indicator field is in the first serving cell.

In a possible design, the DCI includes a second indicator field, and the second indicator field indicates a frequency resource to be used by the terminal device to send the uplink signal to the network device on the first uplink carrier or the second uplink carrier; and a third bit quantity is equal to a fourth bit quantity, the third bit quantity is a bit quantity of the second indicator field when the DCI indicates the first uplink carrier to be used by the terminal device to send the uplink signal to the network device, and the fourth bit quantity is a bit quantity of the second indicator field when the DCI indicates the second uplink carrier to be used by the terminal device to send the uplink signal to the network device.

In a possible design, the first message is a broadcast message or a system message, and the DCI is fallback DCI.

In a possible design, the first downlink carrier, the first uplink carrier, and the second uplink carrier belong to a same cell.

According to a second aspect, this application provides a communication method, and the method includes: determining, by a network device, DCI; and sending, by the network device, the DCI to a terminal device on a first downlink carrier, where the DCI indicates an uplink carrier to be used by the terminal device to send an uplink signal to the network device is a first uplink carrier or a second uplink carrier; and a first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

Therefore, because the first bit quantity is equal to the second bit quantity, after the network device sends the DCI to the terminal device, the terminal device may perform blind detection for the DCI in search space based on the first bit quantity (or the second bit quantity), in other words, only needs to perform blind detection in the search space based on one bit quantity of the DCI, so as to improve efficiency of blind detection for the DCI by the terminal device, and effectively avoid a problem that the terminal device possibly needs to perform blind detection for the DCI based on a plurality of different bit quantities of the DCI in the prior art.

In a possible design, the DCI includes a first indicator field, and the first indicator field indicates the first uplink carrier or the second uplink carrier.

In a possible design, the method further includes: sending, by the network device, a first message to the terminal device, where the first message indicates that the DCI includes a first indicator field, and the first indicator field indicates the first uplink carrier or the second uplink carrier.

In a possible design, the first uplink carrier includes at least one uplink bandwidth part BWP, and the second uplink carrier includes at least one uplink BWP; and the first indicator field indicates an uplink BWP on the first uplink carrier or an uplink BWP on the second uplink carrier.

In a possible design, there are at least two serving cells for the terminal device, and the first uplink carrier and the second uplink carrier belong to one of the at least two serving cells; and the uplink carrier indicated by the first indicator field is in the first serving cell.

In a possible design, there are at least two serving cells for the terminal device, the first uplink carrier and the second uplink carrier belong to one of the at least two serving cells, and the DCI further includes a third indicator field; the third indicator field indicates a first serving cell in the at least two serving cells; and the uplink carrier indicated by the first indicator field is in the first serving cell.

In a possible design, the DCI includes a second indicator field, and the second indicator field indicates a frequency resource to be used by the terminal device to send the uplink signal to the network device on the first uplink carrier or the second uplink carrier; and a third bit quantity is equal to a fourth bit quantity, the third bit quantity is a bit quantity of the second indicator field when the DCI indicates the first uplink carrier to be used by the terminal device to send the uplink signal to the network device, and the fourth bit quantity is a bit quantity of the second indicator field when the DCI indicates the second uplink carrier to be used by the terminal device to send the uplink signal to the network device.

In a possible design, the first message is a broadcast message or a system message, and the DCI is fallback DCI.

In a possible design, the first downlink carrier, the first uplink carrier, and the second uplink carrier belong to a same cell.

According to a third aspect, this application provides a terminal device, and the terminal device includes: a transceiver module, configured to receive DCI from a network device on a first downlink carrier, where the DCI indicates an uplink carrier to be used by the terminal device to send an uplink signal to the network device is a first uplink carrier or a second uplink carrier; and a first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device; and a processing module, configured to determine the first uplink carrier or the second uplink carrier based on the DCI.

In a possible design, the DCI includes a first indicator field, and the first indicator field indicates the first uplink carrier or the second uplink carrier.

In a possible design, the transceiver module is further configured to receive a first message from the network device, where the first message indicates that the DCI includes the first indicator field, and the first indicator field indicates the first uplink carrier or the second uplink carrier; and the processing module is specifically configured to determine the first uplink carrier or the second uplink carrier based on the first indicator field.

In a possible design, the first uplink carrier includes at least one uplink bandwidth part BWP, and the second uplink carrier includes at least one uplink BWP; and the first indicator field indicates an uplink BWP on the first uplink carrier or an uplink BWP on the second uplink carrier.

In a possible design, there are at least two serving cells for the terminal device, and the first uplink carrier and the second uplink carrier belong to one of the at least two serving cells; and the uplink carrier indicated by the first indicator field is in the first serving cell.

In a possible design, there are at least two serving cells for the terminal device, the first uplink carrier and the second uplink carrier belong to one of the at least two serving cells, and the DCI further includes a third indicator field; the third indicator field indicates a first serving cell in the at least two serving cells; and the uplink carrier indicated by the first indicator field is in the first serving cell.

In a possible design, the DCI includes a second indicator field, and the second indicator field indicates a frequency resource to be used by the terminal device to send the uplink signal to the network device on the first uplink carrier or the second uplink carrier; and a third bit quantity is equal to a fourth bit quantity, the third bit quantity is a bit quantity of the second indicator field when the DCI indicates the first uplink carrier to be used by the terminal device to send the uplink signal to the network device, and the fourth bit quantity is a bit quantity of the second indicator field when the DCI indicates the second uplink carrier to be used by the terminal device to send the uplink signal to the network device.

In a possible design, the first message is a broadcast message or a system message, and the DCI is fallback DCI.

In a possible design, the first downlink carrier, the first uplink carrier, and the second uplink carrier belong to a same cell.

According to a fourth aspect, this application provides a network device, and the network device includes: a processing module, configured to determine DCI; and a transceiver module, configured to send the DCI to a terminal device on a first downlink carrier, where the DCI indicates an uplink carrier to be used by the terminal device to send an uplink signal to the network device is a first uplink carrier or a second uplink carrier; and a first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

In a possible design, the DCI includes a first indicator field, and the first indicator field indicates the first uplink carrier or the second uplink carrier.

In a possible design, the transceiver module is further configured to send a first message to the terminal device, where the first message indicates that the DCI includes the first indicator field, and the first indicator field indicates the first uplink carrier or the second uplink carrier.

In a possible design, the first uplink carrier includes at least one uplink bandwidth part BWP, and the second uplink carrier includes at least one uplink BWP; and the first indicator field indicates an uplink BWP on the first uplink carrier or an uplink BWP on the second uplink carrier.

In a possible design, there are at least two serving cells for the terminal device, and the first uplink carrier and the second uplink carrier belong to one of the at least two serving cells; and the uplink carrier indicated by the first indicator field is in the first serving cell.

In a possible design, there are at least two serving cells for the terminal device, the first uplink carrier and the second uplink carrier belong to one of the at least two serving cells, and the DCI further includes a third indicator field; the third indicator field indicates a first serving cell in the at least two serving cells; and the uplink carrier indicated by the first indicator field is in the first serving cell.

In a possible design, the DCI includes a second indicator field, and the second indicator field indicates a frequency resource to be used by the terminal device to send the uplink signal to the network device on the first uplink carrier or the second uplink carrier; and a third bit quantity is equal to a fourth bit quantity, the third bit quantity is a bit quantity of the second indicator field when the DCI indicates the first uplink carrier to be used by the terminal device to send the uplink signal to the network device, and the fourth bit quantity is a bit quantity of the second indicator field when the DCI indicates the second uplink carrier to be used by the terminal device to send the uplink signal to the network device.

In a possible design, the first message is a broadcast message or a system message, and the DCI is fallback DCI.

In a possible design, the first downlink carrier, the first uplink carrier, and the second uplink carrier belong to a same cell.

According to a fifth aspect, this application provides a communications apparatus. The communications apparatus may be a terminal device, and the communications apparatus has a function of implementing the method example in the first aspect. The communications apparatus includes a communications module and a processor.

The communications module is configured to perform communication and interaction with another device, for example, receive downlink control information DCI from a network device on a first downlink carrier. The DCI indicates an uplink carrier to be used by the terminal device to send an uplink signal to the network device is a first uplink carrier or a second uplink carrier. A first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

The communications module may be an RF circuit, a Wi-Fi module, a communications interface, a Bluetooth module, or the like.

The processor is configured to implement a function of the processing module in the third aspect, including: determining the first uplink carrier or the second uplink carrier based on the DCI.

Optionally, the communications apparatus may further include a memory, configured to store a program and the like. Specifically, the program may include program code, and the program code includes an instruction. The memory may include a random access memory (RAM), or may include a non-volatile memory, for example, at least one magnetic disk memory. The processor executes the program stored in the memory, to implement the foregoing function.

In a possible manner, the communications module, the processor, and the memory may be interconnected by using a bus. The bus may be a peripheral component interconnect (PCI) bus, an extended industry standard architecture (EISA) bus, or the like. The bus may be classified into an address bus, a data bus, a control bus, and the like.

According to a sixth aspect, this application provides a communications apparatus. The communications apparatus may be a network device, and the communications apparatus has a function of implementing the method example in the second aspect. The communications apparatus includes a communications module and a processor.

The processor is configured to implement a function of the processing module in the fourth aspect, including: determining DCI.

The communications module is configured to perform communication and interaction with another device, for example, send the DCI to a terminal device on a first downlink carrier. The DCI indicates an uplink carrier to be used by the terminal device to send an uplink signal to the network device is a first uplink carrier or a second uplink carrier. A first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

The communications module may be an RF circuit, a Wi-Fi module, a communications interface, a Bluetooth module, or the like.

Optionally, the communications apparatus may further include a memory, configured to store a program and the like. Specifically, the program may include program code, and the program code includes an instruction. The memory may include a RAM, or may include a non-volatile memory, for example, at least one magnetic disk memory. The processor executes the program stored in the memory, to implement the foregoing function.

In a possible manner, the communications module, the processor, and the memory may be interconnected by using the bus. The bus may be a PCI bus, an EISA bus, or the like. The bus may be classified into an address bus, a data bus, a control bus, and the like.

This application further provides a communications system. The system includes the terminal device provided in any one of the foregoing designs, and may further include the network device that interacts with the terminal device in the solution provided in this application.

This application further provides a computer storage medium. The storage medium stores a software program, and when being read and executed by one or more processors, the software program may implement the communication method provided in the foregoing aspects or the possible designs.

This application further provides a computer program product including an instruction. When the instruction is run on a computer, the computer is enabled to perform the communication method in the foregoing aspects or the possible designs.

This application further provides a computer program. When the computer program is run on a computer, the computer is enabled to perform the communication method in the foregoing aspects or the possible designs.

DETAILED DESCRIPTION OF ILLUSTRATIVE EMBODIMENTS

The following describes this application in detail with reference to the accompanying drawings in the specification.

Figure 1:
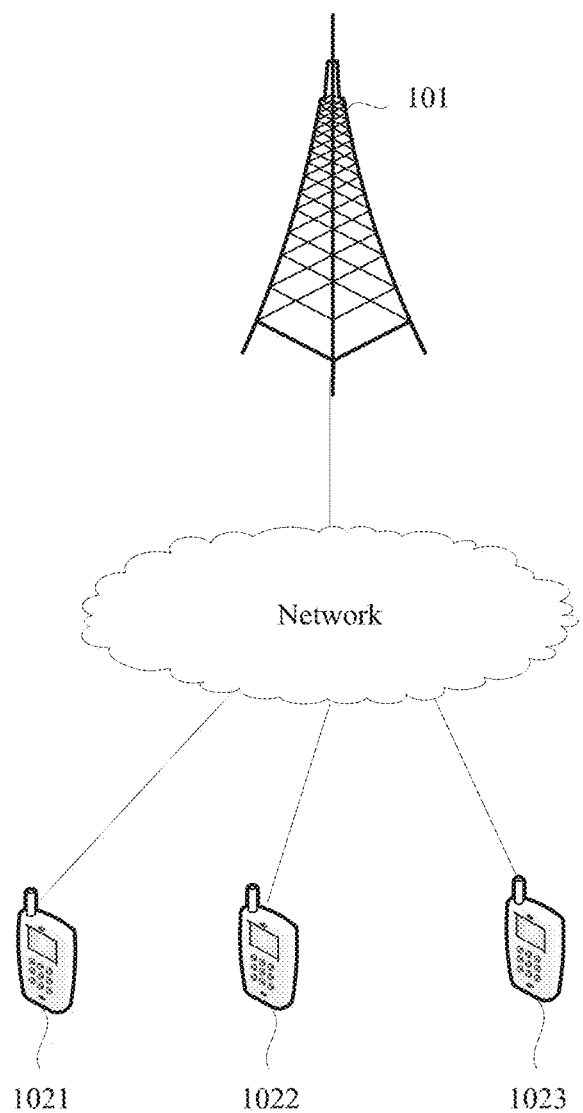
FIG. 1 is a schematic diagram of a system architecture to which this application is applicable.

FIG. 1 is a schematic diagram of a system architecture to which this application is applicable. As shown in FIG. 1, the system architecture includes a network device 101 and one or more terminal devices, such as a terminal device 1021, a terminal device 1022, and a terminal device 1023 shown in FIG. 1. The network device 101 may transmit downlink data to the terminal device 1021, the terminal device 1022, and the terminal device 1023 by using a network. The terminal device 1021, the terminal device 1022, and the terminal device 1023 may transmit uplink data to the network device 101 by using a network.

In this application, a network device may be a base station (BS) device. The base station device may also be referred to as a base station, and is an apparatus that is deployed in a radio access network to provide a wireless communication function. For example, a device that provides a base station function in a 2G network includes a base transceiver station (BTS) and a base station controller (BSC). A device that provides a base station function in a 3G network includes a NodeB and a radio network controller (RNC). A device that provides a base station function in a 4G network includes an evolved NodeB (NB). A device that provides a base station function in a 5G network includes a new radio NodeB (gNB), a centralized unit (CU), a distributed unit, and a new radio controller.

A terminal device is a device having a wireless receiving and sending function. The terminal device may be deployed on land, for example, an indoor or outdoor device, a hand-held device, or a vehicle-mounted device, or may be deployed on the water (for example, a ship), or may be deployed in the air (for example, an airplane, a balloon, or a satellite). The terminal device may be a mobile phone, a tablet computer (such as a Pad), a computer having a wireless receiving and sending function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

In this application, the system architecture shown in FIG. 1 is mainly used as an example for description, but does not constitute a limitation. For example, this application is further applicable to a system architecture in which a macro base station and a micro base station communicate with each other. This is not specifically limited.

A communications system to which the foregoing system architecture is applicable includes but is not limited to: time division duplex-long term evolution (TDD LTE), frequency division duplex-long term evolution (FDD LTE), long term evolution advanced (LTE-A), and various future evolved wireless communications systems (for example, a 5G NR system).

In an example of the 5G NR system, the terminal device may send an uplink signal to the network device by using a supplementary uplink carrier. The supplementary uplink carrier means that an uplink resource is only used for uplink transmission in a current access technology. For example, in the 5G NR system, if a carrier A is only used for uplink transmission in NR system but is not used for downlink transmission, or the carrier A is used for downlink transmission in an LTE communications system but is not used for downlink transmission in NR system, the carrier A is a supplementary uplink carrier.

Figure 2A:
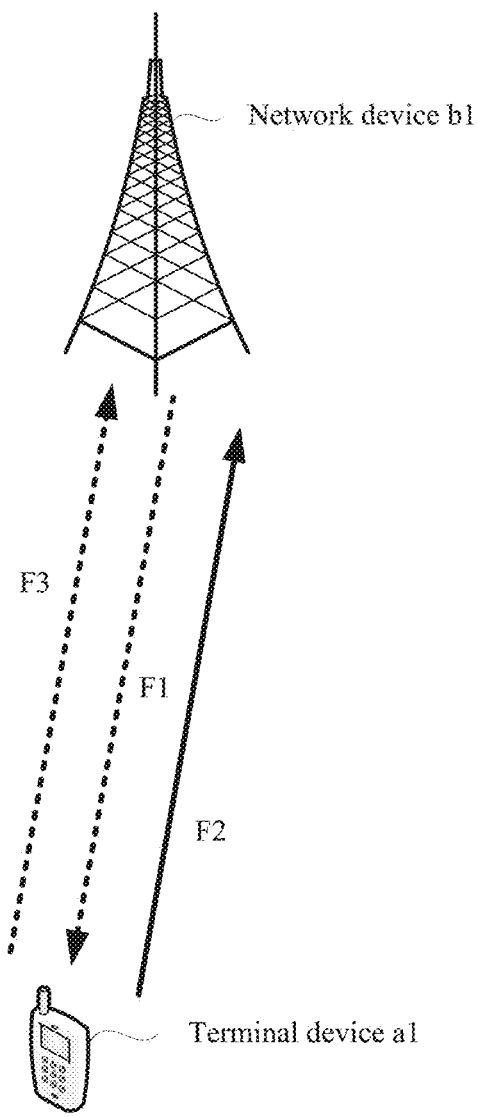
FIG. 2a is a schematic diagram of a possible scenario to which this application is applicable.

In a possible scenario, referring to FIG. 2a, it is assumed that a terminal device a1 performs downlink communication and uplink communication (FDD) by using carriers whose frequencies are F1 and F2 respectively. After a network device b1 configures a supplementary uplink carrier (a carrier F3) and configures, for the terminal device a1, a function of dynamically scheduling an uplink carrier, the terminal device a1 may perform downlink signal transmission by using the carrier F1, and perform uplink signal transmission by using the carrier F2 or the carrier F3. In this case, the downlink carrier F1, the uplink carrier F2, and the uplink carrier F3 belong to a same cell, in other words, the downlink carrier F1, the uplink carrier F2, and the uplink carrier F3 belong to a same bandwidth combination, or the downlink carrier F1 corresponds to the uplink carrier F2 and the uplink carrier F3.

Figure 2B:
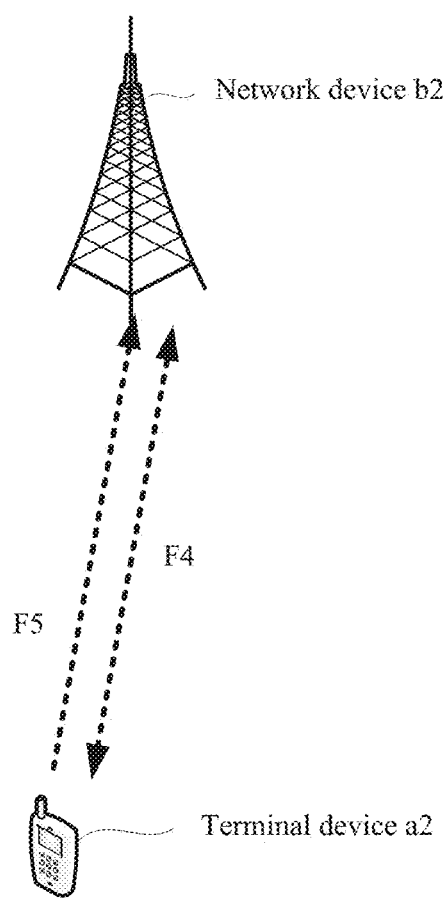
FIG. 2b is a schematic diagram of another possible scenario to which this application is applicable.

In another possible scenario, referring to FIG. 2b, it is assumed that a terminal device a2 performs uplink communication and downlink communication by using a TDD carrier whose frequency is F4. After a network device b2 configures a supplementary uplink carrier (a carrier F5) and configures, for the terminal device a2, a function of dynamically scheduling an uplink carrier, the terminal device a2 may perform downlink signal transmission by using a downlink slot on the carrier F4, and perform uplink signal transmission by using an uplink slot on the carrier F4 or perform uplink signal transmission by using the carrier F5. In this case, the carrier F4 and the uplink carrier F5 belong to a same cell.

In the prior art, for a case in which a terminal device can be scheduled to send uplink signals on two or more uplink carriers, two uplink carriers (a first uplink carrier and a second uplink carrier) are used as an example. When a network device schedules the terminal device to send an uplink signal on the first uplink carrier, the network device sends DCI 1 to the terminal device. When the network device schedules the terminal device to send an uplink signal on the second uplink carrier, the network device sends DCI 2 to the terminal device. A bit quantity of the DCI 1 and a bit quantity of the DCI 2 may be different, so that the terminal device needs to separately perform blind detection for the DCI based on the bit quantity of the DCI 1 and the bit quantity of the DCI 2, in other words, the terminal device needs to separately perform blind detection based on the two different bit quantities of the DCI. Consequently, blind detection for the DCI consumes a relatively long time and has relatively low efficiency.

Based on this, this application provides a communication method, including: receiving, by a terminal device, downlink control information DCI from a network device on a first downlink carrier, and determining a first uplink carrier or a second uplink carrier based on the DCI, where the DCI indicates an uplink carrier to be used by the terminal device to send an uplink signal to the network device is a first uplink carrier or a second uplink carrier; and a first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device. In this application, because the first bit quantity is equal to the second bit quantity, the terminal device may perform blind detection for the DCI in search space based on the first bit quantity (or the second bit quantity), in other words, only needs to perform blind detection in the search space based on one bit quantity of the DCI, so as to improve efficiency of blind detection for the DCI by the terminal device, and effectively avoid a problem that the terminal device possibly needs to perform blind detection for the DCI based on a plurality of different bit quantities of the DCI in prior art.

The following points should be noted: (1) The uplink carrier in this application may be referred to as an uplink resource, an uplink frequency, or an uplink, and similarly, the downlink carrier in this application may be a downlink resource, a downlink frequency, or a downlink. It should be understood that a carrier is a section of frequency resources in frequency domain in technical essence. The frequency resource may be referred to as a carrier in the communications field, and certainly may be described by using another name. This is not limited in this application. (2) The communication method in this application is described by using a case in which the terminal device can be scheduled on the first uplink carrier and the second uplink carrier as an example. The method is also applicable to a case in which the terminal device can be scheduled on a plurality of uplink carriers. When the terminal device can be scheduled on the plurality of uplink carriers, bit quantities of the DCI for the terminal device to send uplink signals to the network device on different uplink carriers are equal. (3) The bit quantity of the DCI may be understood as a size or a length of the DCI. The bit quantity of the DCI may be a bit quantity of a payload of the DCI, or may be a bit quantity of total load of the DCI. For example, the total load of the DCI may include or may not include a padding bit.

Figure 3:
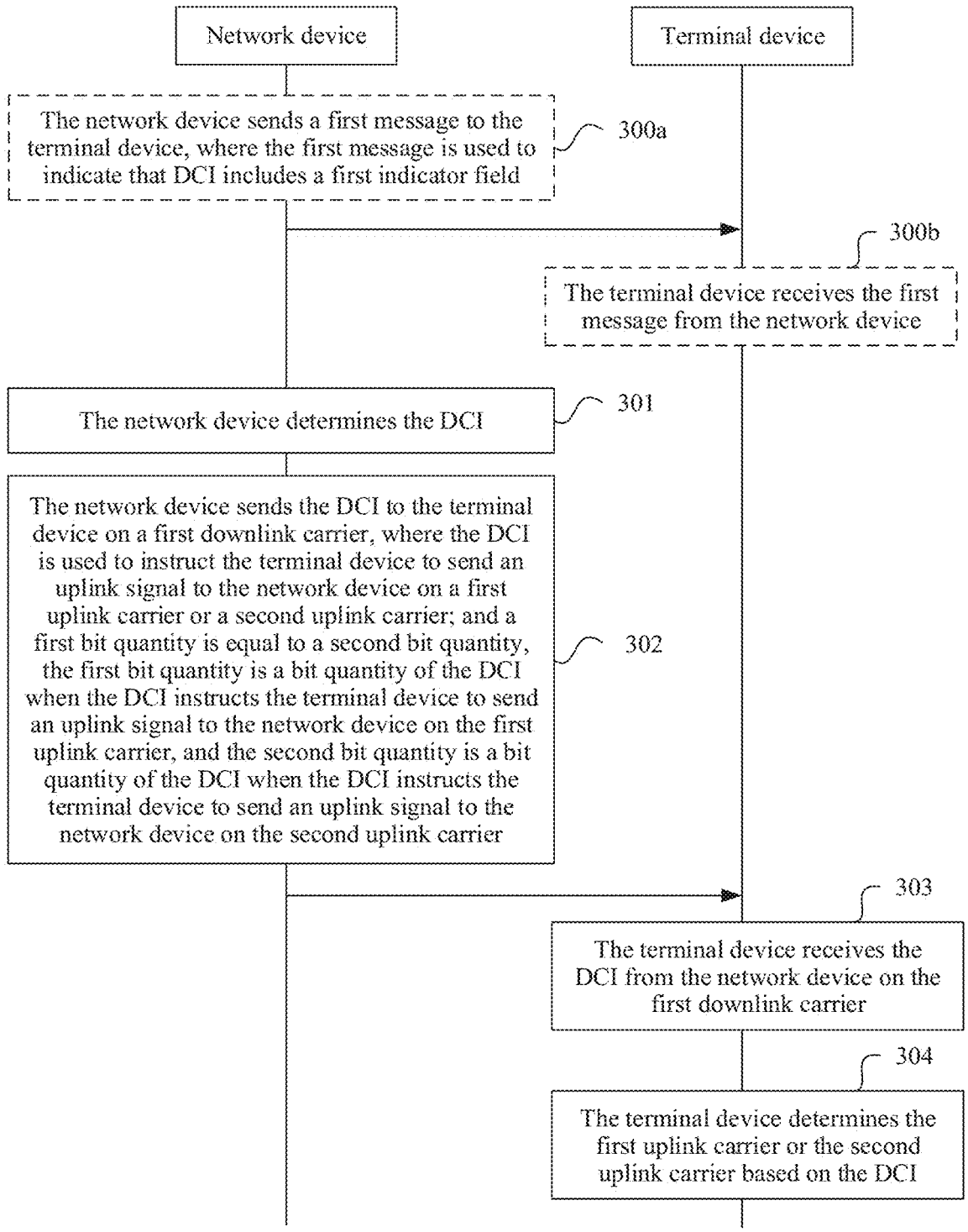
FIG. 3 is a corresponding schematic flowchart of a communication method according to this application.

FIG. 3 is a schematic flowchart of a communication method according to this application. As shown in FIG. 3, the method includes the following steps.

Step 301: A network device determines DCI.

Herein, the network device determines a to-be-scheduled uplink carrier as a first uplink carrier or a second uplink carrier, to generate the DCI based on the determined first uplink carrier or second uplink carrier. Specifically, if the network device determines the to-be-scheduled uplink carrier as the first uplink carrier, the generated DCI indicates an uplink carrier to be used by the terminal device to send an uplink signal to the network device is the first uplink carrier. If the network device determines the to-be-scheduled uplink carrier as the second uplink carrier, the generated DCI indicates an uplink carrier to be used by the terminal device to send an uplink signal to the network device is on the second uplink carrier.

Further, the network device may determine the to-be-scheduled uplink carrier based on a plurality of factors. For example, the network device may determine the to-be-scheduled uplink carrier based on current utilization of the first uplink carrier and current utilization of the second uplink carrier. This is not specifically limited.

In this application, either of the first uplink carrier and the second uplink carrier may be a supplementary uplink carrier. In an example, the first uplink carrier is an NR TDD uplink carrier, and the second uplink carrier is a supplementary uplink carrier.

Step 302: The network device sends the DCI to the terminal device on a first downlink carrier.

The DCI indicates an uplink carrier to be used by the terminal device to send an uplink signal to the network device is the first uplink carrier or the second uplink carrier. A first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device. Herein, the uplink signal may be an uplink data signal, or may be an uplink control signal, or may be an uplink measurement signal. A type of the uplink signal is not limited herein. The uplink data signal may be a physical uplink shared channel (PUSCH), or may have another name. Any signals that are substantially the same as the uplink data signal fall within the protection scope of this application. The uplink measurement signal may be a sounding reference signal (SRS), or certainly may have another name.

In this application, the first downlink carrier, the first uplink carrier, and the second uplink carrier belong to a same cell, or the first downlink carrier, the first uplink carrier, and the second uplink carrier belong to a same bandwidth combination; in other words, the first downlink carrier corresponds to the first uplink carrier and the second uplink carrier, or the first uplink carrier and the second uplink carrier correspond to the first downlink carrier. In an example, if the first uplink carrier is an NR TDD uplink carrier, and the second uplink carrier is a supplementary uplink carrier, the first downlink carrier is an NR TDD downlink carrier, or if the first uplink carrier is a supplementary uplink carrier, and the second uplink carrier is an NR TDD uplink carrier, the first downlink carrier is an NR TDD downlink carrier.

Step 303: The terminal device receives the DCI from the network device on the first downlink carrier.

Herein, because the first bit quantity is equal to the second bit quantity, the terminal device may perform blind detection in search space and obtain the DCI based on the first bit quantity (or the second bit quantity).

Step 304: The terminal device determines the first uplink carrier or the second uplink carrier based on the DCI.

Herein, if determining the first uplink carrier based on the DCI, the terminal device may send the uplink signal to the network device on the first uplink carrier. If determining the second uplink carrier based on the DCI, the terminal device may send the uplink signal to the network device on the second uplink carrier.

The following describes content included in DCI in this application.

The DCI may include a first indicator field, and the first indicator field indicates the first uplink carrier or the second uplink carrier. Therefore, in step 304, the terminal device may determine the first uplink carrier or the second uplink carrier based on the first indicator field. It should be noted that the terminal device may determine the first uplink carrier or the second uplink carrier in many manners based on the DCI, and this is merely a possible determining manner.

Further, a possible implementation of the first indicator field is as follows: For a scenario in which the network device may allocate a resource to the terminal device within a bandwidth range of the first uplink carrier or the second uplink carrier, the first indicator field may indicate the first uplink carrier or the second uplink carrier, and the terminal device may send the uplink signal to the network device on the first uplink carrier or the second uplink carrier indicated by the first indicator field.

Specifically, a correspondence between a state of the first indicator field and an indicated uplink carrier may be preset, or may be preconfigured by the network device and then sent to the terminal device. Therefore, after receiving the DCI, the terminal device may obtain the state of the first indicator field through parsing, to determine the first uplink carrier or the second uplink carrier based on the correspondence between the state of the first indicator field and the indicated uplink carrier.

In an example, the first indicator field may include one bit, and the correspondence between the state of the first indicator field and the indicated uplink carrier may be shown in Table 1a or Table 1b.

TABLE 1a

Example 1 of a correspondence in a first possible implementation

| State of the first indicator field | Indicated uplink carrier |
| --- | --- |
| 0 | First uplink carrier |
| 1 | Second uplink carrier |

TABLE 1b

Example 2 of a correspondence in the first possible implementation

| State of the first indicator field | Indicated uplink carrier |
| --- | --- |
| 1 | First uplink carrier |
| 0 | Second uplink carrier |

As shown in Table 1a, when the state of the first indicator field is "0", the first uplink carrier is indicated, or when the state of the first indicator field is "1", the second uplink carrier is indicated. As shown in Table 1b, when the state of the first indicator field is "0", the second uplink carrier is indicated, or when the state of the first indicator field is "1", the first uplink carrier is indicated.

Optionally, the first indicator field may be a cell-common (cell common or cell specific) field. It should be understood that all terminal devices in a cell have a same understanding of the first indicator field. For example, for any terminal device, when the state of the first indicator field is 0, an uplink carrier indicated by the first indicator field is an NR TDD uplink carrier, or when the state of the first indicator field is 1, an uplink carrier indicated by the first indicator field is an SUL carrier. The first indicator field may alternatively be a terminal device-specific (UE specific) field. It should be understood that terminal devices in a cell may have different understandings of the first indicator field. For example, for a first terminal device, when the state of the first indicator field is 0, an uplink carrier indicated by the first indicator field is an NR TDD uplink carrier, or when the state of the first indicator field is 1, an uplink carrier indicated by the first indicator field is an SUL carrier. For a second terminal device, when the state of the first indicator field is 0, an uplink carrier indicated by the first indicator field is an SUL carrier, or when the state of the first indicator field is 1, an uplink carrier indicated by the first indicator field is an NR TDD uplink carrier.

It should be noted that the network device may send a plurality of types of DCI to the terminal device, and the DCI may include a plurality of types of a first indicator field. For some types of DCI, the first indicator field may be a cell-common field, and for some other types of DCI, the first indicator field may be a terminal device-specific field.

In another possible implementation, in a 5G NR system, a maximum bandwidth of a carrier may reach 400 MHz, but a maximum bandwidth capability supported by the terminal device may not reach such the high bandwidth. Therefore, when the terminal device does not support a bandwidth capability of a carrier, the network device first needs to configure one or more bandwidth parts (BWPs) for the terminal device on the carrier, and then allocates a resource to the terminal device within a range of the BWP. In this case, the first uplink carrier may include at least one uplink BWP, and the second uplink carrier may include at least one uplink BWP. In an example, the first uplink carrier includes two uplink BWPs that are respectively an uplink BWP 1*a* and an uplink BWP 1*b*, and the second uplink carrier includes two uplink BWPs that are respectively an uplink BWP 2*a* and an uplink BWP 2*b*. It should be noted that 1*a*, 1*b*, 2*a*, and 2*b* are merely used to distinguish between the four different BWPs, but do not constitute a limitation on a method for numbering the BWPs. The four BWPs may alternatively be numbered as a BWP 0, a BWP 1, a BWP 2, and a BWP 3, or may be numbered in another manner. The DCI needs to indicate an uplink BWP on the first uplink carrier or an uplink BWP on the second uplink carrier, so that the terminal device can send an uplink signal to the network device on the uplink BWP on the first uplink carrier that is indicated by the DCI or the uplink BWP on the second uplink carrier that is indicated by the DCI.

Optionally, the DCI includes a first indicator field, and the first indicator field indicates an uplink BWP on the first uplink carrier or an uplink BWP on the second uplink carrier.

Similarly, a correspondence between a state of the first indicator field and an indicated uplink carrier may be preset, or may be preconfigured by the network device and then sent to the terminal device.

In an example, the first indicator field may include two parts. A first part indicates a target uplink carrier, and a second part indicates a BWP on the target uplink carrier. Based on the foregoing example, it may be set that the first part of the first indicator field includes one bit, the second part of the first indicator field includes one bit, the first part is a high bit, and the second part is a low bit. Therefore, the correspondence between the state of the first indicator field and the indicated content may be shown in Table 2a.

TABLE 2a

| Example 1 of a correspondence in a second possible implementation | |
|---|---|
| State of the first indicator field | Indicated content |
| 10 | BWP 1a |
| 11 | BWP 1b |
| 00 | BWP 2a |
| 01 | BWP 2b |

It should be noted that Table 2a is only a possible example for representation. In another example, the low bit in the first indicator field may indicate the target uplink carrier, and the high bit may indicate the BWP on the target uplink carrier.

In another example, a part used to indicate a target uplink carrier and a part used to indicate a BWP on the target uplink carrier are not distinguished between each other in the first indicator field. Based on the foregoing example, it may be set that the first indicator field includes two bits. A correspondence between a state of the first indicator field and indicated content may be shown in Table 2b.

TABLE 2b

| Example 2 of a correspondence in the second possible implementation | |
|---|---|
| State of the first indicator field | Indicated content |
| 10 | BWP 1a |
| 11 | BWP 2a |
| 00 | BWP 1b |
| 01 | BWP 2b |

It should be noted that Table 2b is only a possible example for representation. In another example, the foregoing correspondence may be flexibly set.

It should be further noted that a quantity of BWPs included in the first uplink carrier or the second uplink carrier is not limited to 2 in this embodiment, and may be 3, 4, or more. In addition, a quantity of BWPs included in the first uplink carrier may be different from a quantity of BWPs included in the second uplink carrier. For example, the quantity of BWPs in the first uplink carrier is 4, and the quantity of BWPs in the second uplink carrier is 1.

A bit quantity of the first indicator field is not limited to two, and may be three or more.

Optionally, the DCI includes a first indicator field and a fourth indicator field, the first indicator field indicates a target uplink carrier, and the fourth indicator field indicates a target BWP on the target uplink carrier. The first indicator field and the fourth indicator field may be two separate indicator fields. Based on the foregoing example, it may be set that the first indicator field includes one bit, and the fourth indicator field includes one bit. A correspondence between a state of the first indicator field and indicated content may be shown in Table 2c, and a correspondence between a state of the fourth indicator field and indicated content may be shown in Table 2d.

TABLE 2c

| Example 3 of a correspondence in the second possible implementation | |
|---|---|
| State of the first indicator field | Indicated content |
| 1 | First uplink carrier |
| 0 | Second uplink carrier |

TABLE 2d

| Example 4 of a correspondence in the second possible implementation | |
|---|---|
| State of the fourth indicator field | Indicated content |
| 1 | BWP 1a or BWP 2a |
| 0 | BWP 1b or BWP 2b |

In still another possible implementation, the terminal device supports carrier aggregation, in other words, there are at least two serving cells for the terminal device, and the first uplink carrier and the second uplink carrier belong to one of the at least two serving cells. In an example, the terminal device has two serving cells that are respectively a serving cell a and a serving cell b. The serving cell a includes an uplink carrier a1 and an uplink carrier a2, and the serving cell b includes an uplink carrier b1 and an uplink carrier b2. For the serving cell a, if the uplink carrier a1 is the first uplink carrier, the uplink carrier a2 is the second uplink carrier, or if the uplink carrier a1 is the second uplink carrier, the uplink carrier a2 is the first uplink carrier. For the serving cell b, if the uplink carrier b1 is the first uplink carrier, the uplink carrier b2 is the second uplink carrier, or if the uplink carrier b1 is the second uplink carrier, the uplink carrier b2 is the first uplink carrier. It should be noted that a1, a2, b1, and b2 are merely used to distinguish between the four different uplink carriers, but do not constitute a limitation on a method for numbering the uplink carriers. The four uplink carriers may alternatively be numbered as an uplink carrier 0, an uplink carrier 1, an uplink carrier 2, and an uplink carrier 3, or certainly may be numbered in another manner. Similarly, a and b are merely used to distinguish between the two different serving cells, but do not constitute a limitation on a method for numbering the serving cells. The two serving cells may alternatively be numbered as a serving cell 0 and a serving cell 1, or may be numbered in another manner. In this case, the DCI needs to indicate an uplink carrier in one of the at least two serving cells, so that the terminal device can send an uplink signal to the network device based on the uplink carrier in one of the serving cells that is indicated by the DCI.

Optionally, the DCI includes a first indicator field, and the uplink carrier indicated by the first indicator field is in the first serving cell.

Similarly, a correspondence between a state of the first indicator field and an indicated uplink carrier may be preset, or may be preconfigured by the network device and then sent to the terminal device.

In an example, the first indicator field may include two parts. A first part indicates a target serving cell in the two serving cells, and a second part indicates a target uplink carrier in the target serving cell. Based on the foregoing example, it may be set that the first part of the first indicator field includes one bit, the second part of the first indicator field includes one bit, the first part is a high bit, and the second part is a low bit. Therefore, the correspondence between the state of the first indicator field and the indicated content may be shown in Table 3a.

TABLE 3a

Example 1 of a correspondence in a third possible implementation

| State of the first indicator field | Indicated content |
| --- | --- |
| 10 | Uplink carrier a1 |
| 11 | Uplink carrier a2 |
| 00 | Uplink carrier b1 |
| 01 | Uplink carrier b2 |

It should be noted that Table 3a is only a possible example for representation. In another example, the low bit in the first indicator field may indicate the target serving cell, and the high bit may indicate the target uplink carrier in the target serving cell.

In another example, a part used to indicate a target serving cell and a part used to indicate a target uplink carrier in the target serving cell are not distinguished between each other in the first indicator field. Based on the foregoing example, it may be set that the first indicator field includes two bits. A correspondence between a state of the first indicator field and indicated content may be shown in Table 3b.

TABLE 3b

Example 2 of a correspondence in the second possible implementation

| State of the first indicator field | Indicated content |
| --- | --- |
| 10 | Uplink carrier a1 |
| 11 | Uplink carrier b1 |
| 00 | Uplink carrier a2 |
| 01 | Uplink carrier b2 |

It should be noted that Table 3b is only a possible example for representation. In another example, the foregoing correspondence may be flexibly set.

It should be further noted that a quantity of uplink carriers included in the serving cell a or the serving cell b is not limited to 2 in this embodiment, and may be 3, 4, or more. In addition, a quantity of uplink carriers included in the serving cell a may be different from a quantity of uplink carriers included in the serving cell b. For example, the quantity of uplink carriers in the serving cell a is 4, and the quantity of uplink carriers in the serving cell b is 2.

A bit quantity of the first indicator field is not limited to two, and may be three or more.

Optionally, the DCI includes a first indicator field and a third indicator field, the first indicator field indicates a target serving cell, and the third indicator field indicates a target uplink carrier in the target serving cell. The first indicator field and the third indicator field may be two separate indicator fields. Based on the foregoing example, it may be set that the first indicator field includes one bit, and the third indicator field includes one bit. A correspondence between a state of the first indicator field and indicated content may be shown in Table 3c, and a correspondence between a state of the third indicator field and indicated content may be shown in Table 3d.

TABLE 3c

Example 3 of a correspondence in the third possible implementation

| State of the first indicator field | Indicated content |
| --- | --- |
| 0 | Serving cell a |
| 1 | Serving cell b |

TABLE 3d

Example 4 of a correspondence in the third possible implementation

| State of the third indicator field | Indicated content |
| --- | --- |
| 0 | Uplink carrier a1 or uplink carrier b1 |
| 1 | Uplink carrier a2 or uplink carrier b2 |

The DCI may further include a second indicator field, and the second indicator field indicates a frequency resource to be used by the terminal device to send the uplink signal to the network device on the first uplink carrier or the second uplink carrier. A third bit quantity is equal to a fourth bit quantity, the third bit quantity is a bit quantity of the second indicator field when the DCI indicates the first uplink carrier to be used by the terminal device to send the uplink signal to the network device, and the fourth bit quantity is a bit quantity of the second indicator field when the DCI indicates the second uplink carrier to be used by the terminal device to send the uplink signal to the network device.

A bit quantity of the second indicator field (namely, the third bit quantity or the fourth bit quantity) may be specifically predetermined by the network device in a plurality of manners. For example, the bit quantity of the second indicator field may be determined based on both configuration information of the first uplink carrier and configuration information of the second uplink carrier. The configuration information of the first uplink carrier includes a quantity of resource blocks included in a bandwidth of the first uplink carrier. The configuration information of the second uplink carrier includes a quantity of resource blocks included in a bandwidth of the second uplink resource.

In a first possible implementation, the bit quantity of the second indicator field is determined based on a larger value between the quantity of resource blocks included in the bandwidth of the first uplink carrier and the quantity of resource blocks included in the bandwidth of the second uplink carrier. For example, if X1 bits are required when the second indicator field indicates the resource blocks in the bandwidth of the first uplink carrier, X2 bits are required when the second indicator field indicates the resource blocks in the bandwidth of the second uplink carrier, and X1 is greater than X2, it may be determined that the bit quantity of the second indicator field is X1. In this case, when the DCI indicates an uplink carrier to be used by the terminal device to send an uplink signal to the network device is the second uplink carrier, the first X2 bits in the second indicator field indicate a frequency domain resource location, and the last X1-X2 bits are padding bits.

In a second possible implementation, the bit quantity of the second indicator field is determined based on a smaller value between the quantity of resource blocks included in the bandwidth of the first uplink carrier and the quantity of resource blocks included in the bandwidth of the second uplink carrier. For example, if X1 bits are required when the second indicator field indicates the resource blocks in the bandwidth of the first uplink carrier, X2 bits are required when the second indicator field indicates the resource blocks in the bandwidth of the second uplink carrier, and X1 is greater than X2, it may be determined that the bit quantity of the second indicator field is X2s. Therefore, the network device can only schedule the quantity of resource blocks corresponding to X2 bits in the bandwidth of the first uplink carrier, or a granularity of a frequency domain resource scheduled by the network device in the bandwidth of the first uplink carrier is increased.

It should be noted that the bandwidth of the uplink carrier in the foregoing content may be specifically an initial uplink bandwidth part (initial UL BWP) configured by the network device, or may be a default uplink bandwidth part (default UL BWP).

It should be further noted that, in this embodiment of this application, all possible implementations of the first indicator field, the second indicator field, and the third indicator field are not limited to being applied to a case in which the first bit quantity is equal to the second bit quantity, and may be further applied to a case in which the first bit quantity is not equal to the second bit quantity.

For the foregoing method procedure, this application may further include the following steps:

Step 300a: The network device sends a first message to the terminal device, where the first message indicates that the DCI includes the first indicator field.

Step 300b: The terminal device receives the first message from the network device.

Herein, the first message may be a system message or a broadcast message. When a supplementary uplink carrier is configured in the first message, the first message indicates that the DCI includes the first indicator field. In another implementation, if no supplementary uplink carrier is configured in the first message, the first message may indicate that the DCI includes or does not include the first indicator field.

Alternatively, the first message may be higher layer signaling sent by the network device to a specific terminal device. When a function of dynamically scheduling an uplink carrier by the terminal device is configured in the first message, the first message indicates that the DCI includes the first indicator field. In another implementation, when a function of dynamically scheduling an uplink carrier by the terminal device is not configured in the first message, the first message may indicate that the DCI includes or does not include the first indicator field. In this case, the first message may indicate a fixed uplink carrier, or another message sent by the network device to the terminal device may indicate a fixed uplink carrier. The fixed uplink carrier may be the first uplink carrier or the second uplink carrier. For example, when the fixed uplink carrier is the first uplink carrier, the DCI that is sent by the network device to the terminal device and that is used to schedule uplink data transmission can be only used to schedule the terminal device to send uplink data on the first uplink carrier. In this case, the DCI may include or may not include the first indicator field. When the DCI includes the first indicator field, the state of the first indicator field may be a fixed state, for example, is always 0 or 1, or may be a random state, for example, is randomly 0 or 1. In this case, the terminal device may not determine an uplink carrier based on the first indicator field in the DCI, but directly determines the first uplink carrier to send the uplink data. The foregoing features are also applicable to fallback DCI.

For the DCI in this application, the following points should be noted:

(1) The bit quantity of the DCI (namely, the first bit quantity or the second bit quantity) may be predetermined by the network device. Specifically, after configuring the first uplink carrier and the second uplink carrier, the network device may determine the bit quantity of the DCI based on bandwidths, subcarrier spacings, or other configuration parameters of the first uplink carrier and the second uplink carrier. Subsequently, the network device may send the DCI to the terminal device based on the determined bit quantity of the DCI.

(2) The DCI in this application may be the fallback DCI, and the fallback DCI may be understood as default DCI or DCI in a default state, or may be understood as DCI detected by the terminal device in cell-common search space. A name of the DCI is not limited. The terminal device that accesses the network device can only detect the fallback DCI when a specific condition is met (for example, the terminal device does not receive configuration information sent by the network device by using RRC signaling), and sends an uplink signal to the network device based on the detected fallback DCI. In this application, for the fallback DCI, because the first bit quantity is equal to the second bit quantity, it can be effectively ensured that the bit quantity of the DCI remains unchanged in a process in which the network device performs RRC reconfiguration, so as to avoid a case in which the network device and the terminal device have inconsistent understandings of the bit quantity of the DCI. The fallback DCI may be fallback DCI specially used for uplink scheduling, or may be fallback DCI designed for both downlink scheduling and uplink scheduling.

In this application, if the network device configures a supplementary uplink carrier, the fallback DCI sent by the network device includes the first indicator field (and the third indicator field or the fourth indicator field). If the network device configures no supplementary uplink carrier, the fallback DCI sent by the network device may include or may not include the first indicator field (and the third indicator field or the fourth indicator field).

In this application, in a process in which the network device performs RRC configuration or RRC reconfiguration for the terminal device, the bit quantity of the fallback DCI sent by the network device to the terminal device remains unchanged, so that the terminal device can receive the fallback DCI from the network device in the RRC configuration or RRC reconfiguration process, and can perform blind detection for the DCI based on one bit quantity of the DCI. In this way, the terminal device can determine the bit quantity of the fallback DCI in the RRC configuration or RRC reconfiguration process, to perform blind detection for the fallback DCI.

The DCI in this application may alternatively be non-fallback DCI, namely, DCI for a specific terminal device. If the network device configures, for the terminal device, a function of dynamically scheduling an uplink carrier, the DCI sent by the network device to the terminal device includes the first indicator field (and the third indicator field or the fourth indicator field). If the network device does not configure, for the terminal device, a function of dynamically scheduling an uplink carrier, the DCI sent by the network device to the terminal device may include or may not include the first indicator field (and the third indicator field or the fourth indicator field).

For a case in which the network device does not configure, for the terminal device, the function of dynamically scheduling the uplink carrier, the first bit quantity may be or may not be equal to the second bit quantity, and the bit quantities of the second indicator field may be or may not be equal. In an example, when the network device configures the first uplink carrier as a PUSCH carrier, the bit quantity of the second indicator field in the DCI is determined based on the configuration information of the first uplink carrier. When the network device configures the second uplink carrier as a PUSCH carrier, the bit quantity of the second indicator field in the DCI is determined based on the configuration information of the second uplink carrier.

In this application, search space of first DCI may be the same as or may be different from search space of second DCI. The first DCI indicates an uplink carrier to be used by the terminal device to send the uplink signal to the network device is the first uplink carrier, and the second DCI indicates an uplink carrier to be used by the terminal device to send the uplink signal to the network device is the second uplink carrier.

There is no association relationship between the search space of the first DCI and an uplink carrier scheduled by using the first DCI. To be specific, the network device may send the first DCI or the second DCI to the terminal device in the first search space, or the network device may send the first DCI to the terminal device in the first search space and send the second DCI to the terminal device in the second search space, or the network device may send the first DCI to the terminal device in the second search space and send the second DCI to the terminal device in the first search space.

Specifically, for the fallback DCI, the search space of the first DCI is the same as the search space of the second DCI. For the non-fallback DCI, the search space of the first DCI may be the same as or may be different from the search space of the second DCI.

For the foregoing method procedure, this application further provides a terminal device and a network device. For specific implementation of the terminal device and the network device, refer to the foregoing method procedure.

Figure 4:
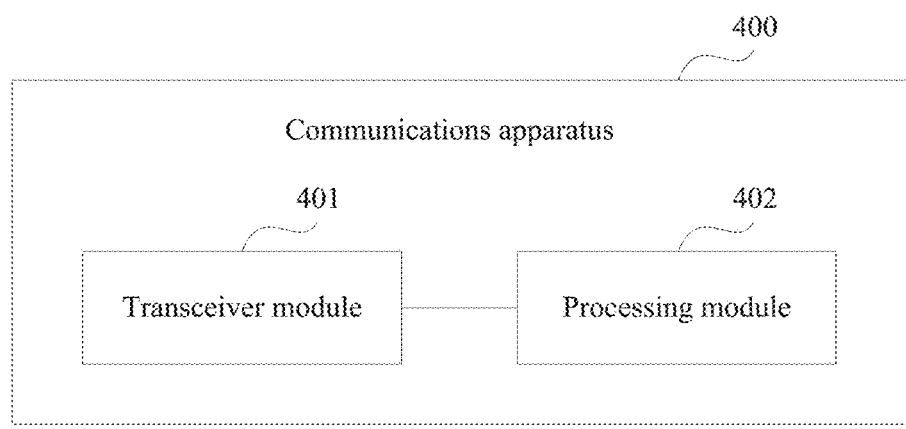
FIG. 4 is a schematic structural diagram of a communications apparatus according to this application.

Based on the foregoing embodiment, this application provides a communications apparatus. The communications apparatus may be a terminal device, and is configured to implement corresponding procedures or steps performed by the terminal device in the method embodiment shown in FIG. 3. Referring to FIG. 4, a communications apparatus 400 may include a transceiver module 401 and a processing module 402.

The transceiver module 401 is configured to receive DCI from a network device on a first downlink carrier. The DCI indicates an uplink carrier to be used by the terminal device to send an uplink signal to the network device is a first uplink carrier or a second uplink carrier. A first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

The processing module 402 is configured to determine the first uplink carrier or the second uplink carrier based on the DCI.

In a possible design, the DCI includes a first indicator field, and the first indicator field indicates the first uplink carrier or the second uplink carrier.

In a possible design, the transceiver module 401 is further configured to receive a first message from the network device. The first message indicates that the DCI includes the first indicator field, and the first indicator field indicates the first uplink carrier or the second uplink carrier.

The processing module 402 is specifically configured to determine the first uplink carrier or the second uplink carrier based on the first indicator field.

In a possible design, the first uplink carrier includes at least one uplink bandwidth part BWP, and the second uplink carrier includes at least one uplink BWP.

The first indicator field indicates an uplink BWP on the first uplink carrier or an uplink BWP on the second uplink carrier.

In a possible design, there are at least two serving cells for the terminal device, and the first uplink carrier and the second uplink carrier belong to one of the at least two serving cells.

The uplink carrier indicated by the first indicator field is in the first serving cell.

In a possible design, there are at least two serving cells for the terminal device, the first uplink carrier and the second uplink carrier belong to one of the at least two serving cells, and the DCI further includes a third indicator field.

The third indicator field indicates a first serving cell in the at least two serving cells.

The uplink carrier indicated by the first indicator field is in the first serving cell.

In a possible design, the DCI includes a second indicator field. The second indicator field indicates a frequency resource to be used by the terminal device to send the uplink signal to the network device on the first uplink carrier or the second uplink carrier. A third bit quantity is equal to a fourth bit quantity, the third bit quantity is a bit quantity of the second indicator field when the DCI indicates the first uplink carrier to be used by the terminal device to send the uplink signal to the network device, and the fourth bit quantity is a bit quantity of the second indicator field when the DCI indicates the second uplink carrier to be used by the terminal device to send the uplink signal to the network device.

In a possible design, the first message is a broadcast message or a system message, and the DCI is fallback DCI.

In a possible design, the first downlink carrier, the first uplink carrier, and the second uplink carrier belong to a same cell.

Figure 5:
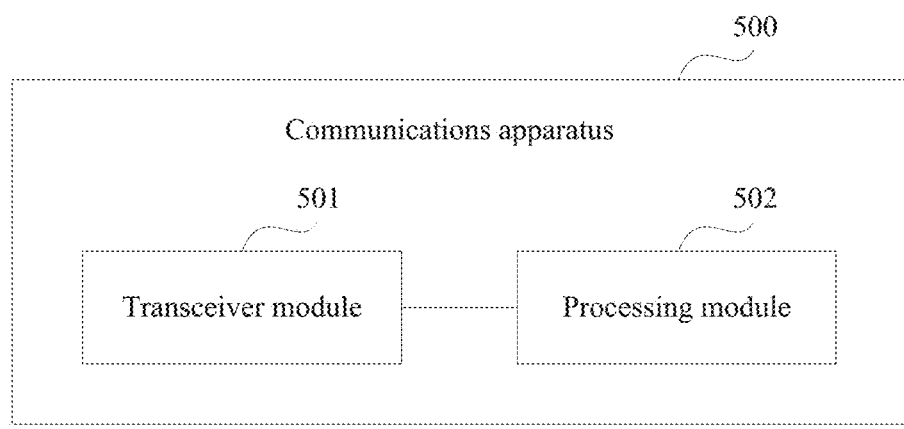
FIG. 5 is a schematic structural diagram of another communications apparatus according to this application.

Based on the foregoing embodiment, this application further provides a communications apparatus. The communications apparatus may be a network device, and is configured to implement corresponding procedures or steps performed by the network device in the method embodiment shown in FIG. 3. Referring to FIG. 5, a communications apparatus 500 may include a transceiver module 501 and a processing module 502. Specifically, The processing module 502 is configured to determine DCI.

The transceiver module 501 is configured to send the DCI to a terminal device on a first downlink carrier. The DCI indicates an uplink carrier to be used by the terminal device to send an uplink signal to the network device is a first uplink carrier or a second uplink carrier. A first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

In a possible design, the DCI includes a first indicator field, and the first indicator field indicates the first uplink carrier or the second uplink carrier.

In a possible design, the transceiver module 501 is further configured to send a first message to the terminal device. The first message indicates that the DCI includes the first indicator field, and the first indicator field indicates the first uplink carrier or the second uplink carrier.

In a possible design, the first uplink carrier includes at least one uplink bandwidth part BWP, and the second uplink carrier includes at least one uplink BWP.

The first indicator field indicates an uplink BWP on the first uplink carrier or an uplink BWP on the second uplink carrier.

In a possible design, there are at least two serving cells for the terminal device, and the first uplink carrier and the second uplink carrier belong to one of the at least two serving cells.

The uplink carrier indicated by the first indicator field is in the first serving cell.

In a possible design, there are at least two serving cells for the terminal device, the first uplink carrier and the second uplink carrier belong to one of the at least two serving cells, and the DCI further includes a third indicator field.

The third indicator field indicates a first serving cell in the at least two serving cells.

The uplink carrier indicated by the first indicator field is in the first serving cell.

In a possible design, the DCI includes a second indicator field. The second indicator field indicates a frequency resource to be used by the terminal device to send the uplink signal to the network device on the first uplink carrier or the second uplink carrier. A third bit quantity is equal to a fourth bit quantity, the third bit quantity is a bit quantity of the second indicator field when the DCI indicates the first uplink carrier to be used by the terminal device to send the uplink signal to the network device, and the fourth bit quantity is a bit quantity of the second indicator field when the DCI indicates the second uplink carrier to be used by the terminal device to send the uplink signal to the network device.

In a possible design, the first message is a broadcast message or a system message, and the DCI is fallback DCI.

In a possible design, the first downlink carrier, the first uplink carrier, and the second uplink carrier belong to a same cell.

It should be noted that, in this embodiment of this application, module division is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a read-only memory (Read-Only Memory, ROM), a random access memory (RAM), a magnetic disk, or an optical disc.

Figure 6:
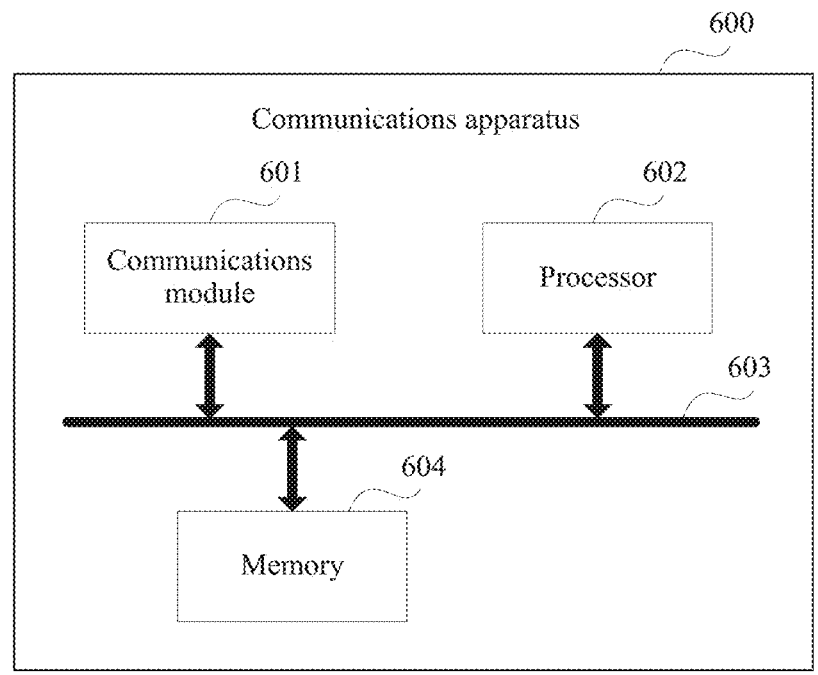
FIG. 6 is a schematic structural diagram of another communications apparatus according to this application.

Based on the foregoing embodiment, this application further provides a communications apparatus. The communications apparatus may be a terminal device, and is configured to implement corresponding procedures or steps performed by the terminal device in the method embodiment shown in FIG. 3. The communications apparatus has a function of the communications apparatus 400 shown in FIG. 4. Referring to FIG. 6, a communications apparatus 600 includes a communications module 601 and a processor 602.

The communications module 601 is configured to perform communication and interaction with another device, for example, receive downlink control information DCI from a network device on a first downlink carrier. The DCI indicates an uplink carrier to be used by the terminal device to send an uplink signal to the network device is a first uplink carrier or a second uplink carrier. A first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

The communications module 601 may be an RF circuit, a Wi-Fi module, a communications interface, a Bluetooth module, or the like.

The processor 602 is configured to implement a function of the processing module in the third aspect, including: determining the first uplink carrier or the second uplink carrier based on the DCI.

Optionally, the communications apparatus 600 may further include a memory 604, configured to store a program and the like. Specifically, the program may include program code, and the program code includes an instruction. The memory 604 may include a RAM, or may include a non-volatile memory, for example, at least one magnetic disk memory. The processor 602 executes the program stored in the memory 604, to implement the foregoing function.

In a possible manner, the communications module 601, the processor 602, and the memory 604 are communicatively connected. For example, the communications module 601, the processor 602, and the memory 604 may be interconnected by using a bus 603. The bus 603 may be a PCI bus, an EISA bus, or the like. The bus may be classified into an address bus, a data bus, a control bus, and the like. For ease of representation, only one thick line is used to represent the bus in FIG. 6, but this does not mean that there is only one bus or only one type of bus.

Figure 7:
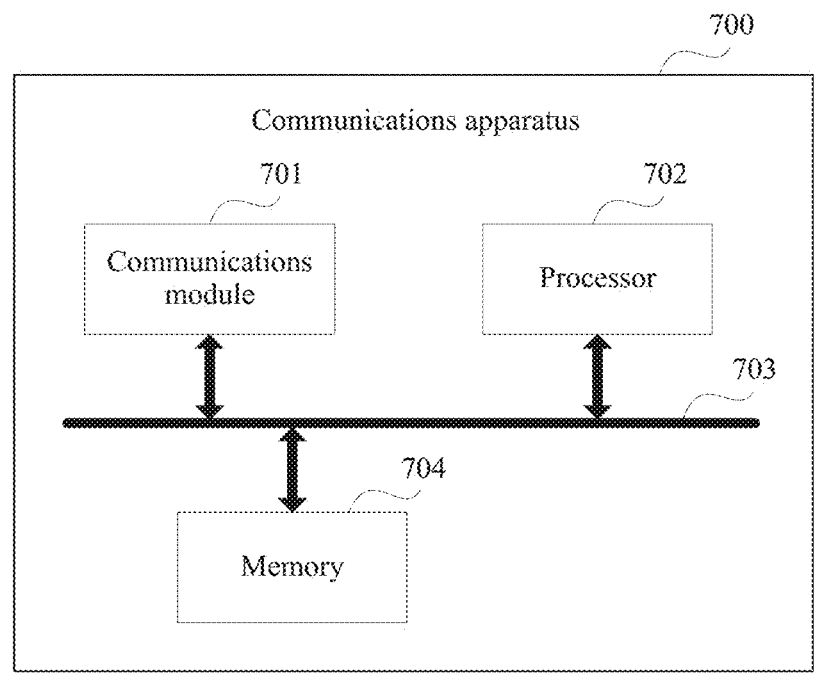
FIG. 7 is a schematic structural diagram of another communications apparatus according to this application.

Based on the foregoing embodiment, this application further provides a communications apparatus. The communications apparatus may be a network device, and is configured to implement corresponding procedures or steps performed by the network device in the method embodiment shown in FIG. 3. The communications apparatus has a function of the communications apparatus 500 shown in FIG. 5. Referring to FIG. 7, a communications apparatus 700 includes a communications module 701 and a processor 702.

The processor 702 is configured to implement a function of the processing module in the fourth aspect, including: determining DCI.

The communications module 701 is configured to perform communication and interaction with another device, for example, send the DCI to a terminal device on a first downlink carrier. The DCI indicates an uplink carrier to be used by the terminal device to send an uplink signal to the network device is a first uplink carrier or a second uplink carrier. A first bit quantity is equal to a second bit quantity, the first bit quantity is a bit quantity of the DCI for indicating the first uplink carrier to be used by the terminal device to send an uplink signal to the network device, and the second bit quantity is a bit quantity of the DCI for indicating the second uplink carrier to be used by the terminal device to send an uplink signal to the network device.

The communications module 701 may be an RF circuit, a Wi-Fi module, a communications interface, a Bluetooth module, or the like.

Optionally, the communications apparatus 700 may further include a memory 704, configured to store a program and the like. Specifically, the program may include program code, and the program code includes an instruction. The memory 704 may include a RAM, or may include a non-volatile memory, for example, at least one magnetic disk memory. The processor 702 executes the program stored in the memory 704, to implement the foregoing function.

In a possible manner, the communications module 701, the processor 702, and the memory 704 are communicatively connected. For example, the communications module 701, the processor 702, and the memory 704 may be interconnected by using a bus 703. The bus 703 may be a PCI bus, an EISA bus, or the like. The bus may be classified into an address bus, a data bus, a control bus, and the like. For ease of representation, only one thick line is used to represent the bus in FIG. 7, but this does not mean that there is only one bus or only one type of bus.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of the present invention without departing from the spirit and scope of this application. This application is intended to cover these modifications and variations provided that they fall within the scope of protection defined by the following claims and their equivalent technologies.

What is claimed is:

1. A communication method, wherein the method comprises:
   receiving downlink control information (DCI) from a network device on a first downlink carrier, the DCI indicating which one of a first uplink carrier being a non-supplementary uplink carrier and a second uplink carrier being a supplementary uplink (SUL) carrier is to be used for sending an uplink transmission to the network device, the DCI for indicating the first uplink carrier and the DCI for indicating the second uplink carrier having an equal bit quantity, wherein the first downlink carrier, the first uplink carrier, and the second uplink carrier belong to a same cell; and
   sending the uplink transmission on the first uplink carrier or on the second uplink carrier to the network device based on the DCI.

2. The method according to claim 1, wherein the DCI comprises an indicator field indicating which one of the first uplink carrier and the second uplink carrier is to be used for sending the uplink transmission.

3. The method according to claim 2, wherein the indicator field indicates the first uplink carrier when the indicator field has a first state value, and the indicator field indicates the second uplink carrier when the indicator field has a second state value.

4. The method according to claim 2, wherein the indicator field has 1 bit.

5. The method according to claim 2, wherein the indicator field is a cell common field, the DCI indicates the first uplink carrier that is a new radio time division duplex uplink carrier when a value of the indicator field is 0, and the DCI indicates the second uplink carrier that is the supplementary uplink carrier when a value of the indicator field is 1.

6. The method according to claim 2, wherein the first uplink carrier comprises at least one first uplink bandwidth part (BWP), and the second uplink carrier comprises at least one second uplink BWP; and the indicator field indicates a first uplink BWP on the first uplink carrier or a second uplink BWP on the second uplink carrier.

7. The method according to claim 2, further comprising:
receiving a first message from the network device, wherein the first message indicates that the DCI comprises the indicator field, the first message being a broadcast message or a system message.

8. A communication method, wherein the method comprises:
sending, by a network device, downlink control information (DCI) to a terminal device on a first downlink carrier, the DCI indicating which one of a first uplink carrier being a non-supplementary uplink carrier and a second uplink carrier being a supplementary uplink (SUL) carrier is to be used by the terminal device to send an uplink transmission to the network device, and the DCI for indicating the first uplink carrier and the DCI for indicating the second uplink carrier having an equal bit quantity, wherein the first downlink carrier, the first uplink carrier, and the second uplink carrier belong to a same cell; and
receiving, by the network device, the uplink transmission on an uplink carrier indicated by the DCI.

9. The method according to claim 8, wherein the DCI comprises an indicator field indicating which one of the first uplink carrier and the second uplink carrier is to be used for sending the uplink transmission.

10. The method according to claim 9, wherein the indicator field indicates the first uplink carrier when the indicator field has a first state value, and the indicator field indicates the second uplink carrier when the indicator field has a second state value.

11. The method according to claim 9, wherein the indicator field has 1 bit.

12. The method according to claim 9, wherein the indicator field is a cell common field, the DCI indicates the first uplink carrier that is a new radio time division duplex uplink carrier when a value of the indicator field is 0, and the DCI indicates the second uplink carrier that is the supplementary uplink carrier when a value of the indicator field is 1.

13. The method according to claim 9, wherein the first uplink carrier comprises at least one first uplink bandwidth part (BWP), and the second uplink carrier comprises at least one second uplink BWP; and the indicator field indicates a first uplink BWP on the first uplink carrier or a second uplink BWP on the second uplink carrier.

14. The method according to claim 9, further comprising:
sending, by the network device, a first message to the terminal device, wherein the first message indicates that the DCI comprises the indicator field, the first message being a broadcast message or a system message.

15. A terminal device comprising:
a transceiver, configured to receive downlink control information (DCI) from a network device on a first downlink carrier, the DCI indicating which one of a first uplink carrier being a non-supplementary uplink carrier and a second uplink carrier being a supplementary uplink (SUL) carrier is to be used for sending an uplink transmission to the network device, and the DCI for indicating the first uplink carrier and the DCI for indicating the second uplink carrier having an equal bit quantity, wherein the first downlink carrier, the first uplink carrier, and the second uplink carrier belong to a same cell; and
a processor, configured to determine the first uplink carrier or the second uplink carrier based on the DCI for transmitting the uplink transmission.

16. The terminal device according to claim 15, wherein the DCI comprises an indicator field indicating which one of the first uplink carrier and the second uplink carrier is to be used for sending the uplink transmission.

17. The terminal device according to claim 16, wherein the indicator field indicates the first uplink carrier when the indicator field has a first state value, and the indicator field indicates the second uplink carrier when the indicator field has a second state value.

18. The terminal device according to claim 16, wherein the indicator field has 1 bit.

19. The terminal device according to claim 16, wherein the indicator field is a cell common field, the DCI indicates the first uplink carrier that is a new radio time division duplex uplink carrier when a value of the indicator field is 0, and the DCI indicates the second uplink carrier that is the supplementary uplink carrier when a value of the indicator field is 1.

20. The terminal device according to claim 16, wherein the first uplink carrier comprises at least one first uplink bandwidth part (BWP), and the second uplink carrier comprises at least one second uplink BWP; and the indicator field indicates a first uplink BWP on the first uplink carrier or a second uplink BWP on the second uplink carrier.

21. The terminal device according to claim 16, wherein the transceiver is further configured to receive a first message from the network device, wherein the first message indicates that the DCI comprises the indicator field, the first message being a broadcast message or a system message.

22. A network device comprising:
a processor, configured to determine downlink control information (DCI); and
a transceiver, configured to send the DCI to a terminal device on a first downlink carrier, the DCI indicating which one of a first uplink carrier being a non-supplementary uplink carrier and a second uplink carrier being a supplementary uplink (SUL) carrier is to be used by the terminal device to send an uplink transmission to the network device, and the DCI for indicating the first uplink carrier and the DCI for indicating the second uplink carrier having an equal bit quantity, wherein the first downlink carrier, the first uplink carrier, and the second uplink carrier belong to a same cell, and to receive the uplink transmission on an uplink carrier indicated by the DCI.

23. The network device according to claim 22, wherein the DCI comprises an indicator field indicating which one of the first uplink carrier and the second uplink carrier is to be used for sending the uplink transmission.

24. The network device according to claim 23, wherein the indicator field indicates the first uplink carrier when the indicator field has a first state value, and the indicator field indicates the second uplink carrier when the indicator field has a second state value.

25. The network device according to claim 23, wherein the indicator field has 1 bit.

26. The network device according to claim 23, wherein the indicator field is a cell common field, the DCI indicates the first uplink carrier that is a new radio time division duplex uplink carrier when a value of the indicator field is o, and the DCI indicates the second uplink carrier that is the supplementary uplink carrier when a value of the indicator field is 1.

27. The network device according to claim 23, wherein the first uplink carrier comprises at least one first uplink bandwidth part (BWP), and the second uplink carrier comprises at least one second uplink BWP; and
the indicator field indicates a first uplink BWP on the first uplink carrier or a second uplink BWP on the second uplink carrier.

28. The network device according to claim 23, wherein the transceiver is further configured to send a first message to the terminal device, wherein the first message indicates that the DCI comprises the indicator field, the first message being a broadcast message or a system message.

29. A non-transitory computer-readable medium having processor-executable instructions stored thereon, the processor-executable instructions, when executed, facilitate performance of a communication method comprising:
receiving downlink control information (DCI) from a network device on a first downlink carrier, the DCI indicating which one of a first uplink carrier being a non-supplementary uplink carrier and a second uplink carrier being a supplementary uplink (SUL) carrier is to be used for sending an uplink transmission to the network device, and the DCI for indicating the first uplink carrier and the DCI for indicating the second uplink carrier having an equal bit quantity, wherein the first downlink carrier, the first uplink carrier, and the second uplink carrier belong to a same cell; and
sending the uplink transmission on the first uplink carrier or on the second uplink carrier to the network device based on the DCI.

* * * * *